United States Patent
Yamaguchi

(10) Patent No.: US 8,417,435 B2
(45) Date of Patent: Apr. 9, 2013

(54) ECO-RUN SYSTEM, COMPUTER READABLE MEDIUM AND ECO-RUN STATE INFORMING APPARATUS

(75) Inventor: Kazuhi Yamaguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 12/450,790

(22) PCT Filed: Dec. 11, 2007

(86) PCT No.: PCT/JP2007/073859
§ 371 (c)(1),
(2), (4) Date: Oct. 13, 2009

(87) PCT Pub. No.: WO2008/136152
PCT Pub. Date: Nov. 13, 2008

(65) Prior Publication Data
US 2010/0106390 A1    Apr. 29, 2010

(30) Foreign Application Priority Data
Apr. 19, 2007    (JP) ................. 2007-111062

(51) Int. Cl.
G06F 17/00    (2006.01)
F02D 43/00    (2006.01)
(52) U.S. Cl. ............ 701/102; 701/112; 123/179.3
(58) Field of Classification Search .......... 701/102, 701/112; 123/179.3, 179.4, 350
See application file for complete search history.

(56) References Cited

U.S. PATENT DOCUMENTS

| 6,823,827 B2 * | 11/2004 | Sugiura et al. ............ 123/179.4 |
| 7,860,636 B2 * | 12/2010 | Yamaguchi ................ 701/112 |
| 7,860,637 B2 * | 12/2010 | Yamaguchi ................ 701/112 |
| 2004/0214689 A1 * | 10/2004 | Kaneko .................... 477/203 |
| 2006/0095197 A1 | 5/2006 | Nishi et al. |
| 2006/0137652 A1 | 6/2006 | Umezu |
| 2006/0224279 A1 | 10/2006 | Mori |
| 2007/0131188 A1 * | 6/2007 | Hokuto .................... 123/179.4 |

(Continued)

FOREIGN PATENT DOCUMENTS

| JP | A-11-206208 | 8/1999 |
| JP | A-2000-130209 | 5/2000 |

(Continued)

OTHER PUBLICATIONS

Office Action issued in Japanese Patent Application No. 2007-111062 dated Jan. 17, 2012 (with translation).

(Continued)

Primary Examiner — John T. Kwon
Assistant Examiner — Johnny Hoang
(74) Attorney, Agent, or Firm — Oliff & Berridge, PLC

(57) ABSTRACT

The present invention is an eco-run system having an eco-run function that stops and restarts an internal combustion engine depending on a state of a vehicle. The eco-run system includes: table information that prescribes a relationship between a plurality of eco-run prohibition reasons and priorities in which a user is informed of the eco-run prohibition reasons; an eco-run ECU 10 that judges whether an eco-run prohibition reason occurs to the vehicle; and an eco-lamp 41 or a navigation apparatus that, when it is judged by the eco-run ECU 10 that the eco-run prohibition reason occurs to the vehicle, informs the user of the eco-run prohibition reason depending on the priorities prescribed by the table information.

15 Claims, 10 Drawing Sheets

U.S. PATENT DOCUMENTS

| | | | |
|---|---|---|---|
| 2008/0083390 A1* | 4/2008 | Nishikiori | 123/179.4 |
| 2009/0118980 A1* | 5/2009 | Muta et al. | 701/103 |
| 2009/0138184 A1* | 5/2009 | Terada | 701/112 |
| 2009/0198438 A1* | 8/2009 | Jinno | 701/110 |

FOREIGN PATENT DOCUMENTS

| | | |
|---|---|---|
| JP | A-2000-324702 | 11/2000 |
| JP | A-2001-88580 | 4/2001 |
| JP | A-2004-92453 | 3/2004 |
| JP | A-2004-218562 | 8/2004 |
| JP | A-2004-239165 | 8/2004 |
| JP | A-2005-61315 | 3/2005 |
| JP | A-2005-256631 | 9/2005 |
| JP | A-2006-70722 | 3/2006 |
| JP | A-2006-125351 | 5/2006 |
| JP | A-2006-273215 | 10/2006 |
| JP | A-2006-348786 | 12/2006 |

OTHER PUBLICATIONS

Office Action issued in Japanese Patent Application No. 2006-0248 dated Jan. 17, 2012 (with translation).

* cited by examiner

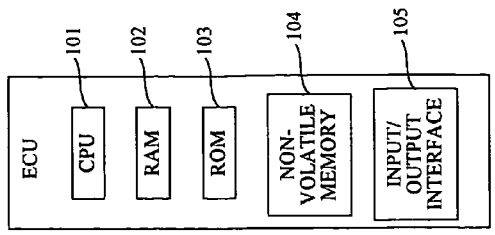
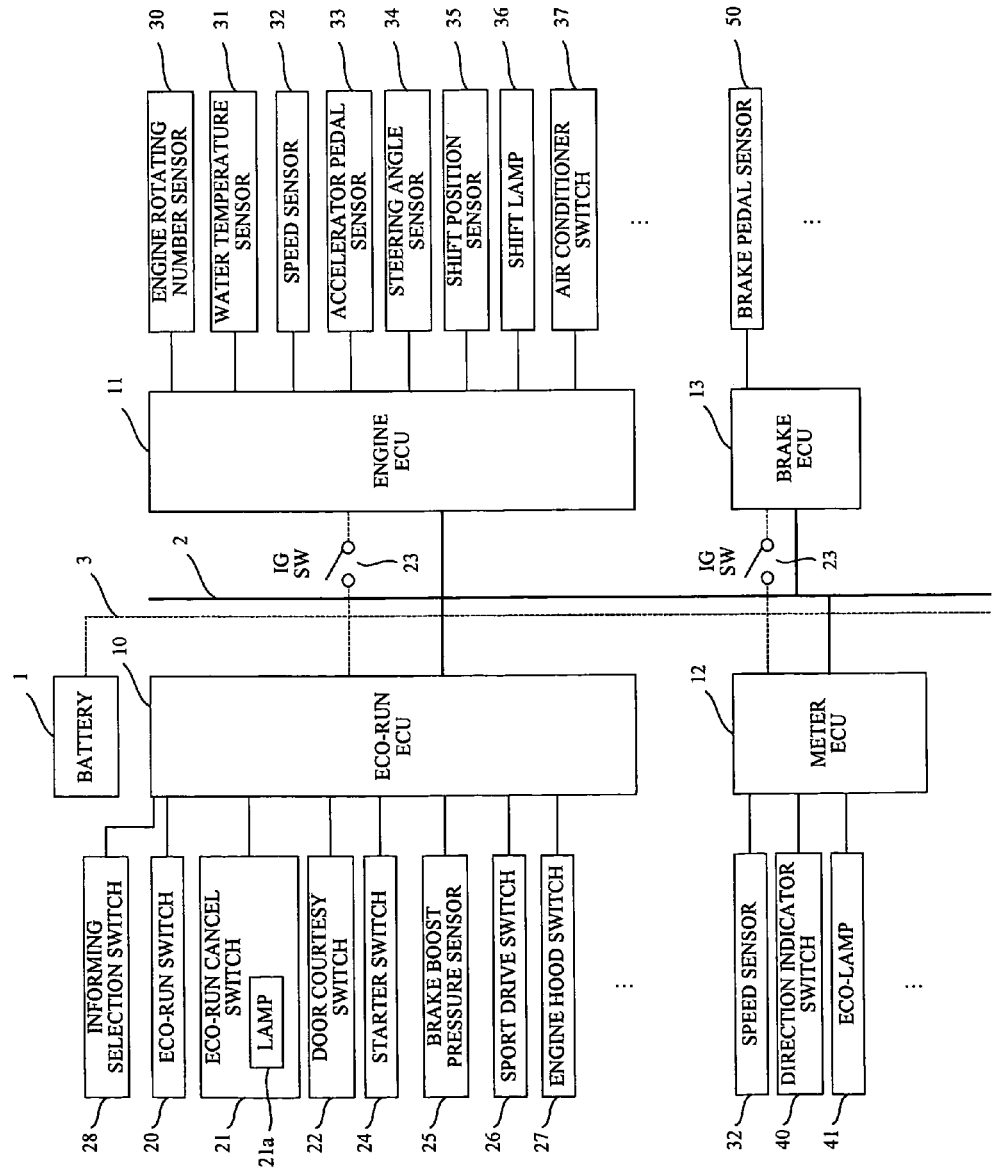

FIG. 2

| ITEM | | | ECO-RUN PROHIBITION REASON | BLINKING CODE | BLINKING PRIORITY |
|---|---|---|---|---|---|
| MATTER WITH WHICH USER CAN COPE | | | ECO-RUN PROHIBITION DUE TO SPORT DRIVE SW | 11 | 2 |
| | | | ECO-RUN PROHIBITION DUE TO STEERING ANGLE MORE THAN GIVEN VALUE | 12 | 3 |
| | | | ECO-RUN PROHIBITION DUE TO ECO-RUN CANCEL SWITCH | 13 | 4 |
| | | | ECO-RUN PROHIBITION DUE TO ENGINE HOOD OPENING | 14 | 5 |
| | | | ECO-RUN PROHIBITION DUE TO DOOR OPENING | 15 | 6 |
| MATTER WITH WHICH USER CANNOT COPE | VEHICLE REQUIRE-MENT (VEHICLE NORMAL TIME) | | RESTOP PROHIBITION DUE TO ENGINE ACTUATION TIME | 21 | 7 |
| | | | ECO-RUN PROHIBITION DUE TO IG ON-TIME | 22 | 8 |
| | | | ECO-RUN PROHIBITION DUE TO SLOPING ROAD | 23 | 9 |
| | | | ECO-RUN PROHIBITION DUE TO PANIC BRAKING | 24 | 10 |
| | | | EXISTENCE OF SLIPPING HISTORY | 25 | 11 |
| | VEHICLE REQUIRE-MENT (VEHICLE ABNORMAL TIME) | | ECO-RUN PROHIBITION DUE TO AIR CONDITIONER REQUIREMENT | 31 | 12 |
| | | | ECO-RUN PROHIBITION DUE TO BATTERY REQUIREMENT | 32 | 13 |
| | | | ECO-RUN PROHIBITION DUE TO ENGINE ECU REQUIREMENT | 33 | 14 |
| | | | ECO-RUN PROHIBITION DUE TO INDETERMINATION OF SHIFT INFORMATION | 34 | 15 |
| | | | ECO-RUN PROHIBITION DUE TO POWER SYSTEM | 35 | 16 |
| BASIC OPERATION | | | NON SHIFT N | - | - |
| | | | NOT PUTTING ON BRAKE AT SHIFT D | - | - |
| | | | NO TRAVEL HISTORY | - | - |
| MANY CODES | | | STATE CORRESPONDING TO THREE OR MORE ECO-RUN PROHIBITION REASONS | 05 | 1 |

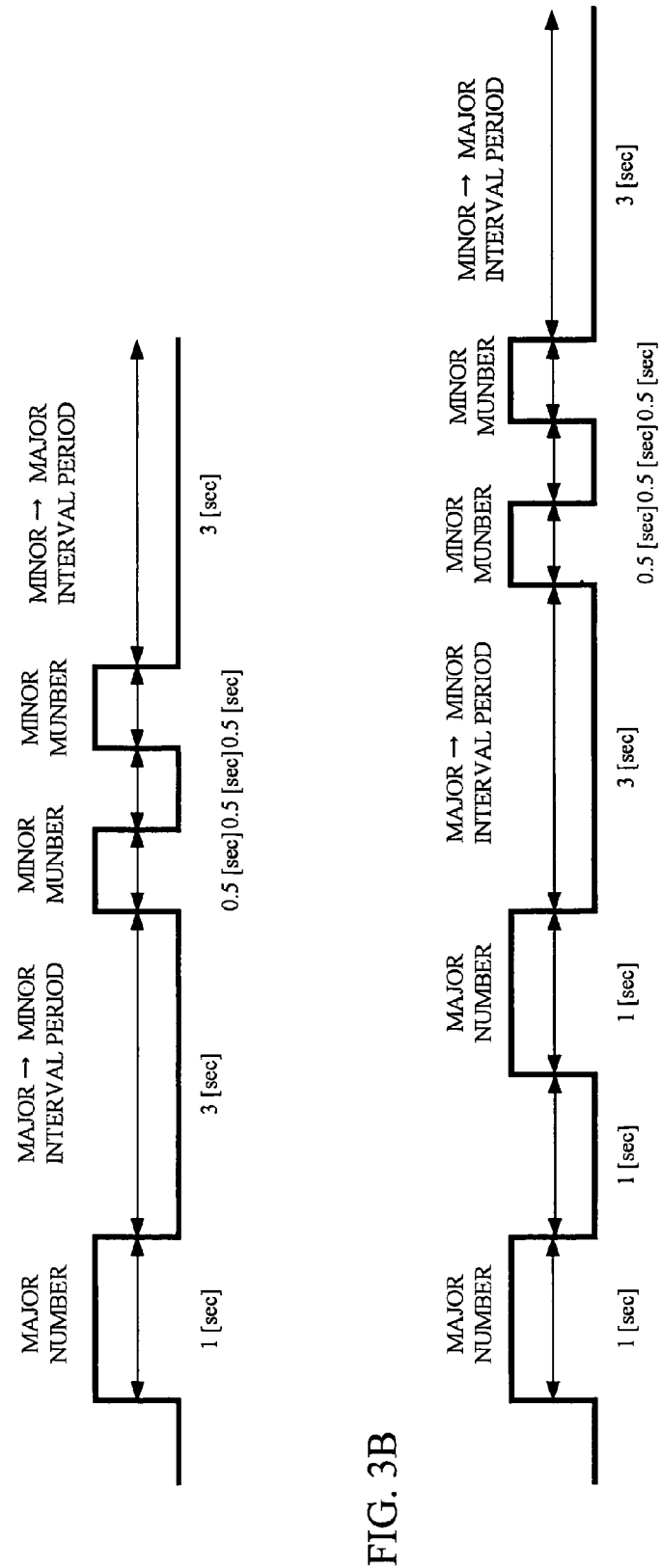

FIG. 6

| ITEM | | ECO-RUN PROHIBITION REASON | DISPLAY CODE | DISPLAY PRIORITY |
|---|---|---|---|---|
| MATTER WITH WHICH USER CAN COPE | | ECO-RUN PROHIBITION DUE TO SPORT DRIVE SW | 11 | 2 |
| | | ECO-RUN PROHIBITION DUE TO STEERING ANGLE MORE THAN GIVEN VALUE | 12 | 3 |
| | | ECO-RUN PROHIBITION DUE TO ECO-RUN CANCEL SWITCH | 13 | 4 |
| | | ECO-RUN PROHIBITION DUE TO ENGINE HOOD OPENING | 14 | 5 |
| | | ECO-RUN PROHIBITION DUE TO DOOR OPENING | 15 | 6 |
| MATTER WITH WHICH USER CANNOT COPE | VEHICLE REQUIRE-MENT (VEHICLE NORMAL TIME) | RESTOP PROHIBITION DUE TO ENGINE ACTUATION TIME | 21 | 7 |
| | | ECO-RUN PROHIBITION DUE TO IG ON-TIME | 22 | 8 |
| | | ECO-RUN PROHIBITION DUE TO SLOPING ROAD | 23 | 9 |
| | | ECO-RUN PROHIBITION DUE TO PANIC BRAKING | 24 | 10 |
| | | EXISTENCE OF SLIPPING HISTORY | 25 | 11 |
| | VEHICLE REQUIR-EMENT (VEHICLE ABNORMAL TIME) | ECO-RUN PROHIBITION DUE TO AIR CONDITIONER REQUIREMENT | 31 | 12 |
| | | ECO-RUN PROHIBITION DUE TO BATTERY REQUIREMENT | 32 | 13 |
| | | ECO-RUN PROHIBITION DUE TO ENGINE ECU REQUIREMENT | 33 | 14 |
| | | ECO-RUN PROHIBITION DUE TO INDETERMINATION OF SHIFT INFORMATION | 34 | 15 |
| | | ECO-RUN PROHIBITION DUE TO POWER SYSTEM | 35 | 16 |
| BASIC OPERATION | | NON SHIFT N | - | - |
| | | NOT PUTTING ON BRAKE AT SHIFT D | - | - |
| | | NO TRAVEL HISTORY | - | - |
| MANY CODES | | STATE CORRESPONDING TO THREE OR MORE ECO-RUN PROHIBITION REASONS | 05 | 1 |

FIG. 10

| ITEM | | ECO-RUN PROHIBITION REASON | BLINKING CODE | BLINKING PRIORITY |
|---|---|---|---|---|
| MATTER WITH WHICH USER CAN COPE | | ECO-RUN PROHIBITION DUE TO SPORT DRIVE SW | 11 | 3 |
| | | ECO-RUN PROHIBITION DUE TO STEERING ANGLE MORE THAN GIVEN VALUE | 12 | 4 |
| | | ECO-RUN PROHIBITION DUE TO ECO-RUN CANCEL SWITCH | 13 | 5 |
| | | ECO-RUN PROHIBITION DUE TO ENGINE HOOD OPENING | 14 | 6 |
| | | ECO-RUN PROHIBITION DUE TO DOOR OPENING | 15 | 7 |
| MATTER WITH WHICH USER CANNOT COPE | VEHICLE REQUIRE-MENT (VEHICLE NORMAL TIME) | RESTOP PROHIBITION DUE TO ENGINE ACTUATION TIME | 01 | 1 |
| | | ECO-RUN PROHIBITION DUE TO IG ON-TIME | | |
| | | ECO-RUN PROHIBITION DUE TO SLOPING ROAD | | |
| | | ECO-RUN PROHIBITION DUE TO PANIC BRAKING | | |
| | | EXISTENCE OF SLIPPING HISTORY | | |
| | VEHICLE REQUIRE-MENT (VEHICLE ABNORMAL TIME) | ECO-RUN PROHIBITION DUE TO AIR CONDITIONER REQUIREMENT | | |
| | | ECO-RUN PROHIBITION DUE TO BATTERY REQUIREMENT | | |
| | | ECO-RUN PROHIBITION DUE TO ENGINE ECU REQUIREMENT | | |
| | | ECO-RUN PROHIBITION DUE TO INDETERMINATION OF SHIFT INFORMATION | | |
| | | ECO-RUN PROHIBITION DUE TO POWER SYSTEM | | |
| BASIC OPERATION | | NON SHIFT N | - | - |
| | | NOT PUTTING ON BRAKE AT SHIFT D | - | - |
| | | NO TRAVEL HISTORY | - | - |
| MANY CODES | | STATE CORRESPONDING TO THREE OR MORE ECO-RUN PROHIBITION REASONS | 05 | 2 |

ECO-RUN SYSTEM, COMPUTER READABLE MEDIUM AND ECO-RUN STATE INFORMING APPARATUS

TECHNICAL FIELD

The present invention relates to an eco-run system, a computer readable medium and an eco-run state informing apparatus that are incorporated in a vehicle.

BACKGROUND ART

Recently, to reduce a fuel cost and exhaust gas, an economy-running system (i.e., eco-run system) is developed and put to practical use. The eco-run system automatically stop an engine when the operation of the engine is unnecessary (e.g. at the time of the stop of the vehicle such as signal waiting, train passage waiting, and person waiting), and automatically starts up (i.e., restarts) the engine again when the operation of the engine is necessary.

An indicator for informing a user (e.g. a driver) of the execution of the eco-run when the automatic stop and the restart of the engine (i.e., the eco-run) are executed, and an indicator for informing the user of the inexecution of the eco-run when the eco-run is not executed are equipped with the vehicle in which such an eco-run system is incorporated. The user can confirm whether the eco-run is executed by reference to these indicators (see Reference 1).

Under the present situation, the eco-run system to a private vehicle still does not become popular, and hence an accurate mechanism of the eco-run system is not widely recognized. In general, the eco-run system is strongly recognized as a system automatically stopping the engine when the vehicle becomes a stop condition.

However, in an actual eco-run control, in the case where a shift lever keeps to a drive range (D-range) and the engine automatically stops for example, if all of stop conditions including a stop state of the vehicle (i.e., a vehicle speed is 0 km/h), an off-state of an accelerator (i.e., a state in which the accelerator is not depressed), an on-state of a brake pedal (i.e., a state in which the brake pedal is depressed), a state of non-panic braking (non-sudden braking), a state in which an accumulation amount of electricity of a battery used when the engine stops automatically is equal to or more than a given level, and other states are satisfied, the engine stops automatically.

Therefore, when any one of the stop conditions is not satisfied though the vehicle is in the stop state (i.e., the vehicle speed is 0 km/h), a phenomenon in which the engine does not stop automatically occurs. When such a phenomenon occurs so far, the indicator only indicates that the eco-run is not executed. Therefore, when the user misrecognizes the eco-run as a system which automatically stops the engine if the vehicle is in the stop state, the user doubts why the engine automatically stops though the vehicle is in the stop state. In addition, anxiety that the eco-run control does not function normally is given to the user, and the user misunderstands that the eco-run control has failed.

Accordingly, there has been proposed an eco-run system that displays reasons that cannot automatically stop the engine (i.e., an unsatisfied stop condition) and coping processes to the reasons on a display unit of a vehicle navigation apparatus by the applicant (see Reference 2).

[Reference 1] Japanese Unexamined Patent Publication No. 2001-88580

[Reference 2] Japanese Unexamined Patent Publication No. 2006-273215

DISCLOSURE OF THE INVENTION

Problems to be Solved by the Invention

However, in the Reference 1, the inexecution of the eco-run is only indicated by the indicator, and hence the user cannot understand the reasons for the inexecution of the eco-run.

In the Reference 2, although the user can understand the reasons for the inexecution of the eco-run, reasons with which the user can cope and reasons with which the user cannot cope in the reasons for the inexecution of the eco-run are displayed on a screen in a mixed state. Therefore, the user which wants to execute the eco-run as much as possible does not prefer a complicated screen display, and desires to be quickly informed of only the reasons with which the user can cope.

Also, the vehicle navigation apparatus is not necessarily mounted in the vehicle executing the eco-run, and hence such a vehicle cannot utilize the technique of the Reference 2.

The present invention has been made in view of the above circumstances, and an object of the present invention is to provide an eco-run system, a computer readable medium, and an eco-run state informing apparatus that can inform a user of a reason for prohibiting eco-run effectively.

Means for Solving the Problems

To achieve the above-mentioned purpose, an eco-run system as an aspect of the present invention having an eco-run function that stops and restarts an internal combustion engine depending on a state of a vehicle, including: a prescribing portion that prescribes a relationship between a plurality of eco-run prohibition reasons and priorities in which a user is informed of the eco-run prohibition reasons; a judgment portion that judges whether an eco-run prohibition reason occurs to the vehicle; and an informing portion that, when it is judged by the judgment portion that the eco-run prohibition reason occurs to the vehicle, informs the user of the eco-run prohibition reason depending on the priorities prescribed by the prescribing portion.

With this construction, the priorities in which a user is informed of the eco-run prohibition reasons are prescribed by the prescribing portion, and hence it is possible to notify the user of a reason for prohibiting eco-run effectively.

Effects of the Invention

According to the present invention, it is capable of informing the user of a reason for prohibiting eco-run effectively.

BRIEF DESCRIPTION OF THE DRAWINGS

FIG. 1A is a block diagram showing the schematic construction of an economy running system (eco-run system) according to a first embodiment of the present invention, and FIG. 1B is a block diagram showing the schematic construction of each ECU (Electronic Control Unit);

FIG. 2 is a diagram showing an example of table information indicative of a relationship between eco-run prohibition reasons and blinking of an eco-lamp;

FIG. 3A is a diagram showing a blinking way of the eco-lamp when a blinking code is "12", and FIG. 3B is a diagram showing a blinking way of the eco-lamp when a blinking code is "22";

FIG. 6 is a diagram showing an example of table information indicative of a relationship between the eco-run prohibition reasons and display on a display unit;

FIG. 10 is a diagram showing a variation of the table information in FIG. 2.

BEST MODE FOR CARRYING OUT THE INVENTION

Figure 4:
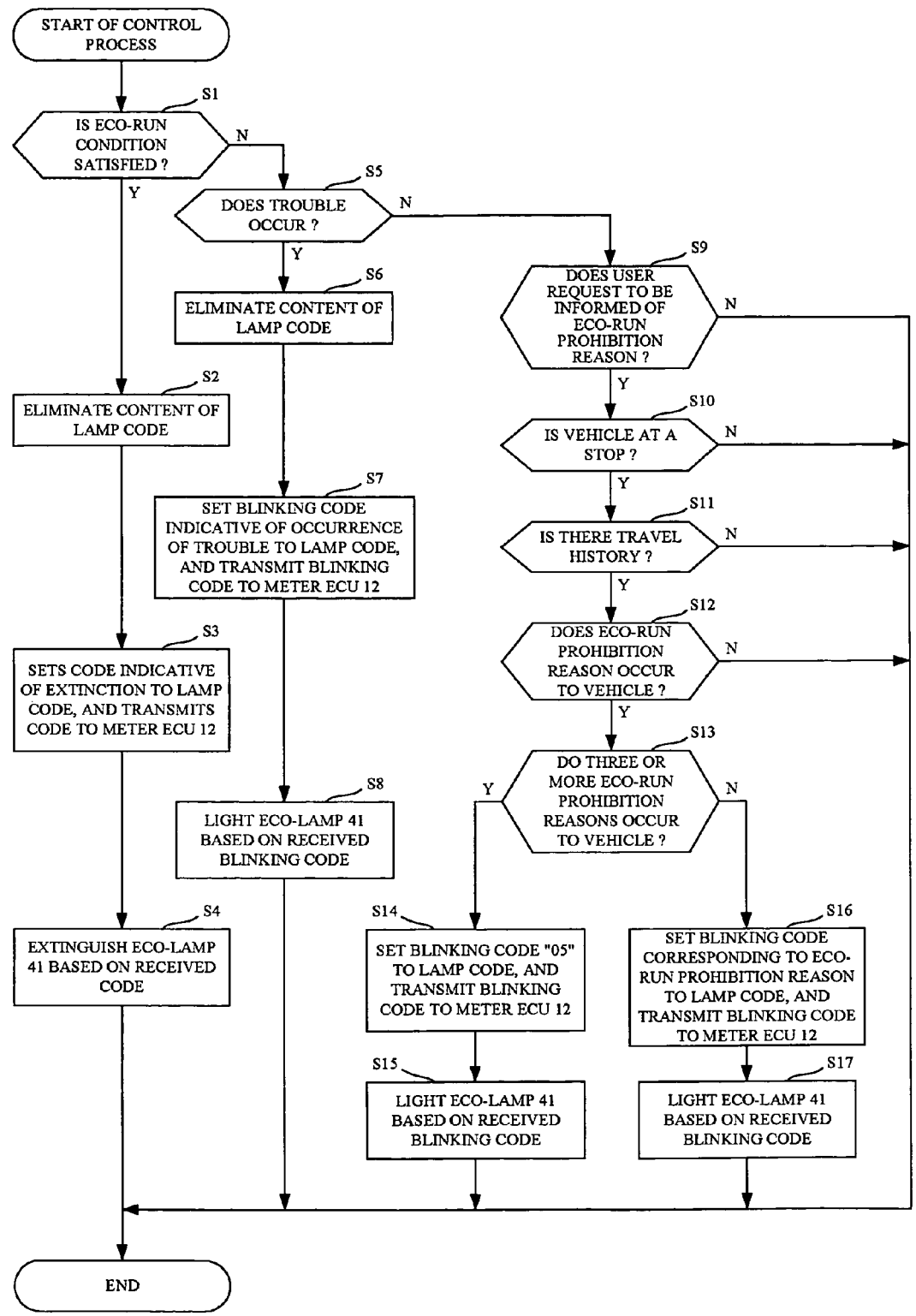
FIG. 4 is a flowchart showing a control process which an eco-run ECU executes.

A description will now be given of preferred embodiments of the present invention with reference to the accompanying drawings.

(First Embodiment)

FIG. 1A is a block diagram showing the schematic construction of an economy running system (eco-run system) according to a first embodiment of the present invention, and FIG. 1B is a block diagram showing the schematic construction of each ECU (Electronic Control Unit).

In FIG. 1A, the eco-run system includes a battery 1, an eco-run ECU 10 (a judgment portion, and setting portion) as an eco-run state informing apparatus, an engine ECU 11, a meter ECU 12 (a control portion), and a brake ECU 13. The eco-run ECU 10, the engine ECU 11, the meter ECU 12, and the brake ECU 13 are connected to each other via a communication line 2. The battery 1 is connected to the eco-run ECU 10 and the meter ECU 12 via an electrical power line 3, and further connected to the engine ECU 11 and the brake ECU 13 via an ignition (IG) switch 23. It should be noted that the eco-run system includes ECUs (an air conditioner ECU, and so on), not shown, to which an electrical power is supplied while an accessory switch (ACC), not shown, turns on. The eco-run ECU 10, and an eco-lamp 41, a display unit 60, or a sound output unit 64 constitute an informing portion. The eco-lamp 41, the display unit 60, or the sound output unit 64 constitutes a prohibition reason informing portion.

As shown in FIG. 1B, each of these ECUs includes a microcomputer which has a CPU 101 executing various calculation processes, a ROM 102 storing a process program, and a RAM 103 temporarily storing process data, a nonvolatile memory 104, and an input/output interface 105 for various signals. The CPU 101 executes required calculation processes depending on the process program read out from the ROM 102, and various controls are executed based on the results of the calculation.

A lamp code for controlling blinking of an eco-lamp connected to the meter ECU 12 is set to the RAM 103 or the nonvolatile memory 104 of the eco-run ECU 10. The RAM 103 or the nonvolatile memory 104 of the eco-run ECU 10 stores a travel history after the IG switch is turned on. A travel distance of the travel history is calculated by a well-known way by use of a signal from a speed sensor.

Signals detected by each of the ECUs 10 to 13 and calculation process data are configured to be able to mutually communicate between the ECUs 10 to 13 via the communication line 2. The ECUs 10 to 13 execute data communication with each other if needed, operate simultaneously with each other, and execute control therefor.

An eco-run switch (SW) 20, a lamp interlock type eco-run cancel switch 21 (a cancel portion), a door courtesy switch 22, the ignition (IG) switch 23, a starter switch 24, a brake boost pressure sensor 25, a sport drive switch 26, an engine hood switch 27, an informing selection switch 28, and so on are connected to the eco-run ECU 10. The lamp interlock type eco-run cancel switch 21 includes a lamp 21a. The informing selection switch 28 is a switch in which a user can select whether to inform himself or herself of the eco-run prohibition reason. When the user select informing himself or herself of the eco-run prohibition reason, the informing selection switch 28 is depressed, i.e., is turned on.

An on-signal (start-up signal) of the eco-run system from the eco-run switch 20, an off-signal (stop signal) of the eco-run system from the eco-run cancel switch 21, a signal indicative of opening and closing of a door from the door courtesy switch 22, an IG on/off-signal from the ignition (IG) switch 23, a starter on/off-signal from the starter switch 24, a signal indicative of a brake boost pressure value from the brake boost pressure sensor 25, an on/off-signal from the sport drive switch 26, an opening/closing signal of an engine hood from the engine hood switch 27, an on/off-signal from the informing selection switch 28, and other signals are input to the eco-run ECU 10.

The eco-run ECU 10 executes eco-run control (automatic stop and restart control) which stops and restarts the engine depending on a state of a vehicle detected by each of the ECUs 10 to 13.

Also, the ignition (IG) switch 23, an engine rotating number sensor 30, a water temperature sensor 31, a speed sensor 32, an accelerator, pedal sensor 33, a steering angle sensor 34, a shift position sensor 35, a shift lamp 36, an air conditioner switch 37, and so on are connected to the engine ECU 11.

The IG on/off-signal from the ignition (IG) switch 23, an engine rotating number signal from the engine rotating number sensor 30, an engine coolant water temperature signal from the water temperature sensor 31 mounted on the engine, a speed signal from the speed sensor 32 mounted on a drive wheel, an accelerator pedal on/off-signal from the accelerator pedal sensor 33 detecting the presence or absence of depressing an accelerator pedal, a steering angle signal of a steering from the steering angle sensor 34, a shift position signal from the shift position sensor 35 detecting an operation position (P, R, N, D, 2, or L) of a shift lever, an air conditioner on/off-signal from the air conditioner switch 37, and other signals are input to the engine ECU 11. The engine ECU 11 outputs a signal to the shift lamp 36 to illuminate the operation position of the shift lever detected by the shift position sensor 35, based on the shift position signal.

In the engine ECU 11, an engine control such as a fuel injection control, and a shift transmission control of a transmission are executed.

The speed sensor 32, a direction indicator switch 40, the eco-lamp 41 (informing portion), and so on are connected to the meter ECU 12. The meter ECU 12 controls display items to a meter panel provided ahead of a driver's seat. A remaining amount signal from a fuel sensor (not shown) detecting a remaining amount of the fuel, an operation signal from the direction indicator switch, and other signals necessary for a meter control are input to the meter ECU 12.

The eco-lamp does not light in time of the eco-run, and blinks in time of a vehicle trouble or when the eco-run driving cannot be executed (i.e., when the vehicle correspond to eco-run prohibition reasons described hereinafter). A brake on/off-signal from a pedal sensor detecting the presence or absence of depressing a brake pedal, and other signals necessary for a brake control are input to the brake ECU 13.

FIG. 2 is a diagram showing an example of table information indicative of a relationship between eco-run prohibition reasons and blinking of the eco-lamp. The table information (a prescribing portion) is stored into the ROM 103 or the nonvolatile memory 104 of the eco-run ECU 10. The table information is also described in an instruction manual of the vehicle.

The eco-run prohibition reasons are reasons for not stopping the engine though the vehicle is in a stop state. The eco-run prohibition reasons of the table information are divided into four items of "matter with which user can cope", "matter with which user cannot cope", "basic operation", and "many codes" as shown in FIG. 2.

In the item of "matter with which user can cope", the eco-run prohibition reasons in which the vehicle executes the eco-run when the user executes an operation eliminating the eco-run prohibition reasons are included. In the item of "matter with which user cannot cope", the eco-run prohibition reasons in which the eco-run of the vehicle is prohibited regardless of the operation of the user are included. In this item, the eco-run prohibition reasons when the vehicle is normal and abnormal are included.

A difference between "vehicle requirement (vehicle abnormal time)" of FIG. 2, and a trouble state (diagnosis detection) judged at step S5 of FIG. 4 described later is shown as follows.

The trouble state (diagnosis detection) judged at step S5 of FIG. 4 described later indicates a trouble state of sensors, actuator, and so on which the eco-run ECU 10 mainly uses for controls, and indicates a state where the eco-run control cannot be executed. On the contrary, "vehicle requirement (vehicle abnormal time)" of FIG. 2 indicates a state where the vehicle state is not normal, and it is judged that the eco-run ECU 10 had better not perform the eco-run control (engine stop), such as a state where a large amount of current is consumed by the air conditioner, not shown, a state where a capacity of a battery has decreased, a state where the present shift position cannot be detected, or the like though it is not worse than the above-mentioned trouble state.

In the item of "basic operation", the eco-run prohibition reasons fully known by a user which has bought an eco-run vehicle are included. When the vehicle state corresponds to three or more eco-run prohibition reasons, the vehicle state corresponds to the item of "many codes".

A blinking code of the table information indicates a blinking way of the eco-lamp 41. The blinking code is composed of two digit numeral. An uppermost digit is allocated in a major number corresponding to number of times in which the eco-lamp 41 is lit for one second, and a lowermost digit is allocated in a minor number corresponding to number of times in which the eco-lamp 41 is lit for 0.5 seconds. Specifically, when the eco-run ECU 10 always monitors the vehicle state, and the vehicle state corresponds to the eco-run prohibition reason, the eco-run ECU 10 sets the blinking code corresponding to the eco-run prohibition reason to the lamp code in the RAM 102, and transmits the blinking code to the meter ECU 12. The meter ECU 12 causes the eco-lamp 41 to light, based on the received blinking code.

Here, FIG. 3A shows the blinking way of the eco-lamp 41 when the blinking code is "12", and FIG. 3B shows the blinking way of the eco-lamp 41 when the blinking code is "22".

When the blinking code is "12", the major number is "1", the minor number is "2". Therefore, as shown in FIG. 3A, the eco-lamp 41 first lights once for 1 second, waits for 3 seconds as an interval period, lights once for 0.5 seconds, waits for 0.5 seconds as the interval period, and lights once for 0.5 seconds again. That is, the lighting for 0.5 seconds is executed twice.

When the blinking code is "22", the major number is "2", and the minor number is "2". Therefore, as shown in FIG. 3B, the eco-lamp 41 first lights once for 1 second, waits for 1 second as the interval period, and lights once for 1 second again. Then, the eco-lamp 41 waits for 3 seconds as the interval period, lights once for 0.5 seconds, and waits for 0.5 seconds as the interval period, and lights once for 0.5 seconds again. That is, each of the lighting for 1 second and the lighting for 0.5 seconds is executed twice.

Thus, the user can understand the blinking code by the blinking of the eco-lamp 41, and hence can judge the eco-run prohibition reasons based on the table information. Also, the blinking way of the eco-lamp 41 is changed for each of the eco-run prohibition reasons, to thereby inform the user of the eco-run prohibition reasons effectively.

A blinking priority of the table information of FIG. 2 indicates order of priorities of the eco-run prohibition reasons of which the user is informed by the blinking of the eco-lamp 41. When there are two eco-run prohibition reasons for example, the blinking of the eco-lamp 41 is executed from the eco-run prohibition reason having high priority. When the eco-run prohibition reasons are "eco-run prohibition due to sport drive SW" and "eco-run prohibition due to door opening" for example, the former is higher in the blinking priority (when a value of the blinking priority is low, the priority is high), and hence the blinking of the eco-lamp 41 corresponding to the former of the eco-run prohibition reasons is first executed.

When there are three eco-run prohibition reasons, the blinking of the eco-lamp 41 is executed based on the blinking code "05" corresponding to the item of "many codes". A reason for not blinking the eco-lamp 41 for each of the eco-run prohibition reasons when there are three or more eco-run prohibition reasons is that the blinking number of times increases too much, and hence it becomes impossible for the user to cope with the blinking of the eco-lamp 41, and decoding work of the blinking code by the user is reduced.

In the table information of FIG. 2, the blinking code and the blinking priority are not set in the eco-run prohibition reasons which belong to the item of "basic operation". This is because only the eco-run prohibition reasons fully known by the user which has bought the eco-run vehicle are included in the item of "basic operation", and hence it is not necessary to dare to inform the user of such eco-run prohibition reasons.

In addition, the table information of FIG. 2 is editable by connecting an external device (e.g. a computer), not shown, to the communication line 2, and accessing the eco-run ECU 10.

In the table information of FIG. 2, the higher a frequency of occurrence of the eco-run prohibition reason is, the higher the priority is set, and the smaller the value of the blinking code is set, for each item of "matter with which user can cope", "matter with which user cannot cope", "basic operation", and "many codes". Thereby, the higher the frequency of occurrence of the eco-run prohibition reason is, the shorter a blinking period of the eco-lamp 41 is (i.e., lighting the lamp is completed early). Therefore, the higher the frequency of occurrence of the eco-run prohibition reason is (i.e., the eco-run prohibition reason having high priority), the earlier the user can be informed of the eco-run prohibition reason.

FIG. 4 is a flowchart showing a control process which the eco-run ECU executes.

The eco-run ECU 10 judges whether an eco-run condition is satisfied (step S1). Here, the eco-run ECU 10 judges whether the eco-run is continuing now (i.e., the engine is stopping). When at least one eco-run prohibition reason is satisfied, the eco-run ECU 10 judges that the eco-run condition is not satisfied.

When the eco-run condition is satisfied in step S1 (YES), the eco-run ECU 10 eliminates the content of the lamp code set to the RAM 103 or the nonvolatile memory 104 of the eco-run ECU 10 (step S2). This is because the malfunction of the eco-lamp 41 is caused if the previous content of the lamp code is maintained.

Next, the eco-run ECU 10 sets a code indicative of extinction to the lamp code, and transmits the code to the meter ECU 12 (step S3). The meter ECU 12 extinguishes the eco-lamp 41 based on the received code (step S4), and the present process is terminated.

When the eco-run condition is not satisfied in step S1 (NO), the eco-run ECU 10 judges whether trouble occurs to the sensors, the actuators, and so on connected to the eco-run ECU 10 (step S5).

When the trouble occurs to the sensors, the actuators, and so on connected to the eco-run ECU 10 in step S5 (YES), the eco-run ECU 10 eliminates the content of lamp code set to the RAM 103 or the nonvolatile memory 104 of the eco-run ECU 10 (step S6), sets the blinking code indicative of the occurrence of the trouble to the lamp code, and transmits the blinking code to the meter ECU 12 (step S7). Here, the blinking code indicative of the occurrence of the trouble is "99" for example, and the blinking content of the eco-lamp 41 is a repetition of lighting and extinguishing the eco-lamp 41 for 1 second. The meter ECU 12 lights the eco-lamp 41 based on the received blinking code (step S8), and the present process is terminated.

When the trouble does not occur to the sensors, the actuators, and so on connected to the eco-run ECU 10 in step S5 (NO), the eco-run ECU 10 judges whether the user requests to be informed of the eco-run prohibition reason (step S9). Here, when the eco-run ECU 10 inputs an on-signal from the informing selection switch 28, the eco-run ECU 10 judges that the user requests to be informed of the eco-run prohibition reason.

It should be noted that, when the eco-run control is not executed by turning off the eco-run switch 20 or turning on the eco-run cancel switch 21, the user may not be informed of the eco-run prohibition reason. In this case, the item of "eco-run prohibition reason due to eco-run cancel SW" in FIG. 2 is eliminated.

When the user does not request to be informed of the eco-run prohibition reason in step S9 (NO), the present process is terminated.

On the other hand, when the user requests to be informed of the eco-run prohibition reason in step S9 (YES), the eco-run ECU 10 judges whether the vehicle is at a stop based on the sensor signal from the speed sensor 32 connected to the engine ECU 11 (step S10).

When the vehicle is not at a stop in step S10 (NO), the eco-run is not executed, and the present process is terminated. On the other hand, when the vehicle is at a stop (YES), the eco-run ECU judges whether there is the travel history stored into the RAM 103 or the nonvolatile memory 104 of the eco-run ECU 10 after the IG switch 23 is turned on (step S11).

When there is not the travel history in step S11 (NO), the eco-run is not executed, and the present process is terminated. On the other hand, when there is the travel history in step S11 (YES), the eco-run ECU 10 judges whether the eco-run prohibition reason occurs to the vehicle based on the table information in FIG. 2 stored into the RAM 103 or the nonvolatile memory 104 (step S12).

When the eco-run prohibition reason does not occur to the vehicle in step S12 (NO), the eco-run is not executed, and the present process is terminated. On the other hand, when the eco-run prohibition reason occurs to the vehicle in step S12 (YES), the eco-run ECU 10 judges whether three or more eco-run prohibition reasons occur to the vehicle (step S13). When three or more eco-run prohibition reasons occur to the vehicle (YES), the eco-run ECU 10 sets the blinking code "05" in the table information of FIG. 2 to the lamp code, and transmits the blinking code to the meter ECU 12 (step S14). The meter ECU 12 lights the eco-lamp 41 based on the received blinking code (step S15), and the present process is terminated.

When three or more eco-run prohibition reasons does not occur to the vehicle in step S13 (NO), the eco-run ECU 10 sets the blinking code(s) corresponding to the eco-run prohibition reason(s) which has(have) occurred to the vehicle, to the lamp code, and transmits the blinking code(s) to the meter ECU 12 (step S16). In this case, when there are two eco-run prohibition reasons, the eco-run ECU 10 first transmits the blinking code corresponding to the eco-run prohibition reason having high priority to the meter ECU 12. The meter ECU 12 lights the eco-lamp 41 based on the received blinking code(s) (step S17), and the present process is terminated.

In the above-mentioned process, although the user is informed of the eco-run prohibition reason only while the vehicle is stopping, as shown in steps S10 and S14 to S17, the user may be informed of the eco-run prohibition reason while the ignition switch 23 is on, or the user may be informed of the eco-run prohibition reason such as "speed of vehicle is more than prescribed speed" while the vehicle is moving.

As described in detail above, according to the present embodiment, when it is judged by the eco-run ECU 10 that the eco-run prohibition reason occurs, the user is informed of the eco-run prohibition reason via the blinking of the eco-lamp 41 depending on the priority prescribed in the table information of FIG. 2. Thereby, the priority of the eco-run prohibition reason of which the user is informed can be prescribed by the table information, and hence it is possible to notify the user of the reason for prohibiting the eco-run effectively.

The table information of FIG. 2 prescribes highly the priorities of the eco-run prohibition reasons with which the user can cope, compared with the priorities of the eco-run prohibition reasons with which the user cannot cope. Therefore, the user is informed of the eco-run prohibition reasons with which the user can cope earlier than the eco-run prohibition reasons with which with which the user cannot cope, and hence it is possible to notify the user of the reasons for prohibiting the eco-run effectively. Especially, it can be reduced to give the stress to the user who wants to execute the eco-run as much as possible while driving.

In the above-mentioned embodiment, timing in which the user is informed of the eco-run prohibition reason is in the case where the vehicle is at a stop and there is the travel history, and hence it is possible to avoid holding user's attention while driving, and to avoid disturbing the driving of the vehicle.

When the eco-run switch 20 is off, or the eco-run cancel switch 21 is on, the blinking of the eco-lamp 41 is not executed, so that the intention of the user who does not hope for blinking the eco-lamp 41 can be esteemed. The user can select whether to blink the eco-lamp 41, and hence it is possible to achieve an improved usability for the user.

Moreover, the eco-lamp 41 informs the user of the eco-run prohibition reason by the blinking thereof when the vehicle is at a stop, and informs the user of occurrence of the vehicle trouble by the blinking thereof when the vehicle is not at a stop. Therefore, two functions including a function in which the user is informed of the eco-run prohibition reason, and a function in which the user is informed of occurrence of the vehicle trouble can share a single lamp, thereby making it possible to reduce the cost. Also, in the vehicle in which the eco-lamp is installed, the function in which the user is informed of the eco-run prohibition reason can be added to the eco-lamp without the usage of new parts.

The above-mentioned processes of steps S5 to S8 are processes needed when the function in which the user is informed of occurrence of the trouble (diagnosis), and the function in which the user is informed of the eco-run prohibition reason share the single lamp. When lamps are provided for each function (i.e., two lamps are provided here), the above-mentioned processes of steps S5 to S8 are unnecessary. That is, when the process in step S1 is "NO", the process proceeds to step S9.

In the above-mentioned embodiment, the meter ECU 12 receives the blinking code from the eco-fun ECU 10 and controls the blinking of the eco-lamp 41. However, when the vehicle is at a stop and there is the travel history, if the meter ECU 12 does not receive the blinking code within a given period (e.g. within 3 second after the vehicle stops), the meter ECU 12 may control the eco-lamp 41 to light continuously. Thereby, the user can be notified that the blinking code is not transmitted from the eco-run ECU 10 to the meter ECU 12, and visually understand that the trouble has occurred.

In the above-mentioned embodiment, when the eco-run condition is satisfied, or the trouble does not occur to the sensors, the actuators, and so on connected to the eco-run ECU 10, the content of the lamp code is eliminated. To prevent false blinking of the eco-lamp 41, when a mode is shifted to an idling stop mode, the engine is stalled out, the speed is detected, and so on, the content of the lamp code may be eliminated.

In the above-mentioned embodiment, although the user is informed of the eco-run prohibition reason by the blinking of the eco-lamp 41, the lamp 21a included in the eco-run cancel switch 21 or the shift lamp 36 may be used on behalf of the eco-lamp 41. When the eco-run prohibition reason relates to the eco-run cancel switch 21, the lamp 21a may be blinked on behalf of the eco-lamp 41. When the eco-run prohibition reason relates to the shift lever, the shift lamp 36 may be blinked on behalf of the eco-lamp 41. Thus, when a part relating to the eco-run prohibition reason includes a lamp, the lamp may be blinked on behalf of the eco-lamp 41.

FIG. 10 is a diagram showing a variation of the table information in FIG. 2.

According to the table information of FIG. 10, the priorities of the eco-run prohibition reasons with which the user cannot cope are prescribed highly, compared with the priorities of the eco-run prohibition reasons with which the user can cope. Therefore, the user is informed of the eco-run prohibition reasons with which the user cannot cope earlier than the eco-run prohibition reasons with which the user can cope.

Although the blinking code and the priority corresponding to the item of "matter with which user cannot cope" are brought together in FIG. 10, the blinking code and the priority may be divided into two so as to correspond to the items of "vehicle requirement (vehicle normal time)" and "vehicle requirement (vehicle abnormal time)". In addition, a different blinking code and a different priority may be provided for each of the eco-run prohibition reasons in detail.

When there are the eco-run prohibition reasons of which the user is informed, and the eco-run prohibition reason with which the user cannot cope is included in the eco-run prohibition reasons, the eco-lamp 41 may be blinked according to only the blinking code corresponding to the item with which the user cannot cope. Also, when there are three eco-run prohibition reasons, and the vehicle is in a state corresponding to the item of "many codes", the eco-lamp 41 may be blinked according to only the blinking code corresponding to the item of "many codes".

(Second Embodiment)

Although the user is informed of the eco-run prohibition reason by the eco-lamp 41 in the first embodiment, the user is informed of the eco-run prohibition reason by a navigation apparatus in a second embodiment.

Figures 5A, 5B:
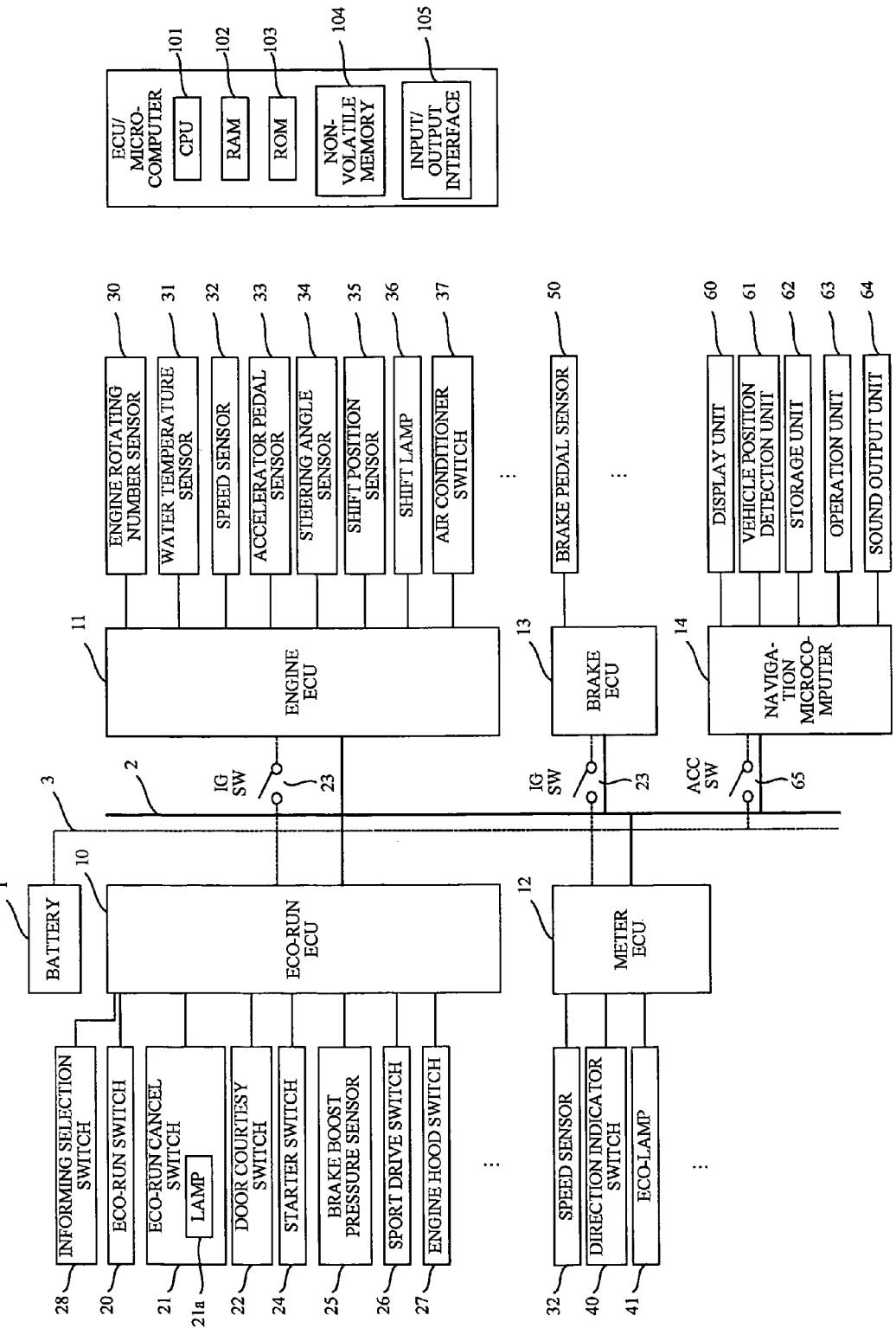
FIG. 5A is a block diagram showing the schematic construction of the eco-run system according to a second embodiment of the present invention.
FIG. 5B is a block diagram showing the schematic construction of each ECU or a microcomputer.

FIG. 5A is a block diagram showing the schematic construction of the eco-run system according to the second embodiment of the present invention, and FIG. 5B is a block diagram showing the schematic construction of each ECU or a microcomputer.

An eco-run system of FIG. 5A according to the second embodiment is different from the eco-run system of FIG. 1A according to the first embodiment in that there is provided the navigation apparatus. The navigation apparatus (an informing portion) includes a navigation microcomputer 14, a display unit 60, a vehicle position detection unit 61, a storage unit 62, an operation unit 63, and a sound output unit 64. The navigation microcomputer 14 includes the same construction as each of the ECUs 10 to 13 as shown in FIG. 5B. The construction of FIG. 5B is the same as that of FIG. 1B.

The navigation microcomputer 14 is connected to each of the ECUs 10 to 13 via the communication line 2, and connected to the battery 1 via the electrical power line 3 and an accessory switch 65. The display unit 60 is composed of a liquid crystal display with a touch panel, and displays map information. The vehicle position detection unit 61 is composed of an antenna for GPS, a GPS receiver, and so on, receives a GPS signal from a communication satellite, and detects a position of the vehicle. The storage unit 62 is a memory, a hard disk, or the like, and stores data necessary to execute navigation functions such as map display, route search, and route guide. The operation unit 63 is composed of button switches, the touch panel, and so on provided on the display unit 60, and inputs an operation instruction. The sound output unit 64 is configured to include an amplifier, a speaker, and so on, and executes sound guide of the navigation.

FIG. 6 is a diagram showing an example of table information indicative of a relationship between the eco-run prohibition reasons and display on the display unit 60. This table information (a prescribing portion) is stored into the RAM 103 or the nonvolatile memory 104 of the eco-run ECU 10.

The table information of FIG. 6 is different from that of FIG. 2 in that the blinking code of the table information of FIG. 2 is changed to a display code for controlling the display unit 60, and the blinking priority of the table information of FIG. 2 is changed to a display priority. The other contents are the same as the table information of FIG. 2.

Figure 7A:
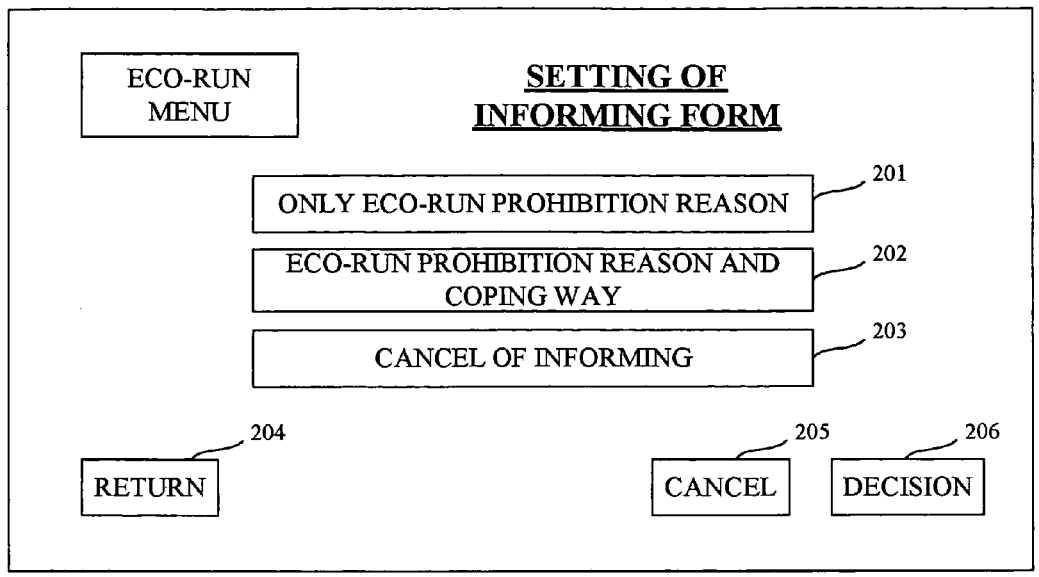
FIG. 7A is a diagram showing an example of a setting screen of informing forms of the eco-run prohibition reason displayed on the display unit.
Figure 7B:
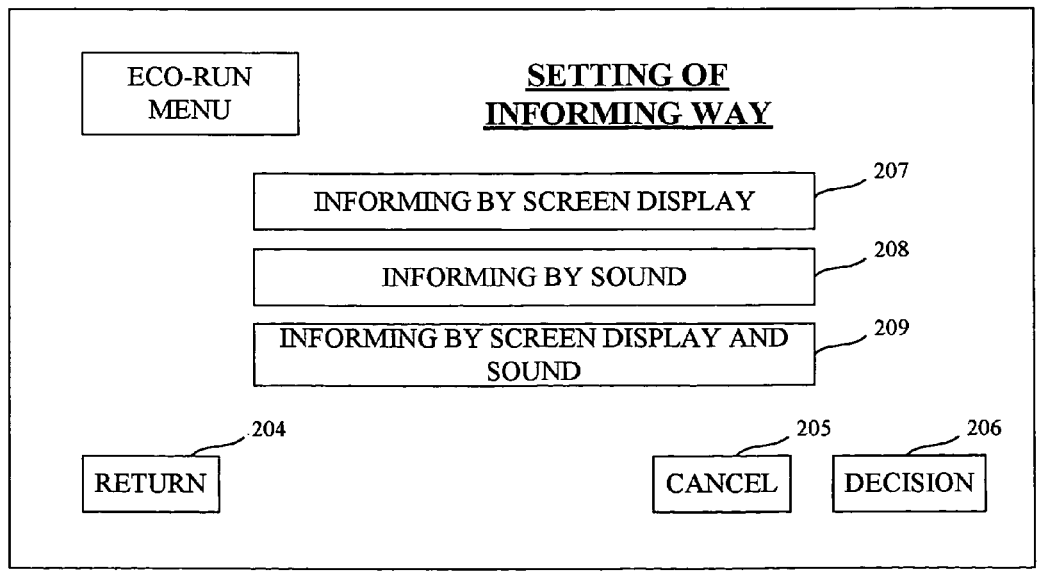
FIG. 7B is a diagram showing an example of a setting screen of informing ways of the eco-run prohibition reason displayed on the display unit.

FIG. 7A is a diagram showing an example of a setting screen of informing forms of the eco-run prohibition reason displayed on the display unit 60, and FIG. 7B is a diagram showing an example of a setting screen of informing ways of the eco-run prohibition reason displayed on the display unit 60.

On a setting screen of informing forms of the eco-run prohibition reason, a button 201 for inputting an instruction in which the user is informed of only the eco-run prohibition reason, a button 202 for inputting an instruction in which the user is informed of the eco-run prohibition reason and a coping way, a button 203 for canceling the informing of the eco-run prohibition reason and the coping way, a return button 204 for inputting an instruction to return to a main menu, a cancel button 205, and a decision button 206 are displayed.

On a setting screen of informing ways of the eco-run prohibition reason, a button 207 for inputting an instruction of the informing by screen display, a button 208 for inputting an instruction of the informing by sound, a button 209 for inputting an instruction of the informing by the screen display and the sound, the return button 204, the cancel button 205, and the decision button 206 are displayed.

The user can execute setting of a desired informing form and a desired informing way by depressing any button displayed on the setting screen of FIGS. 7A and 7B.

Figure 8:
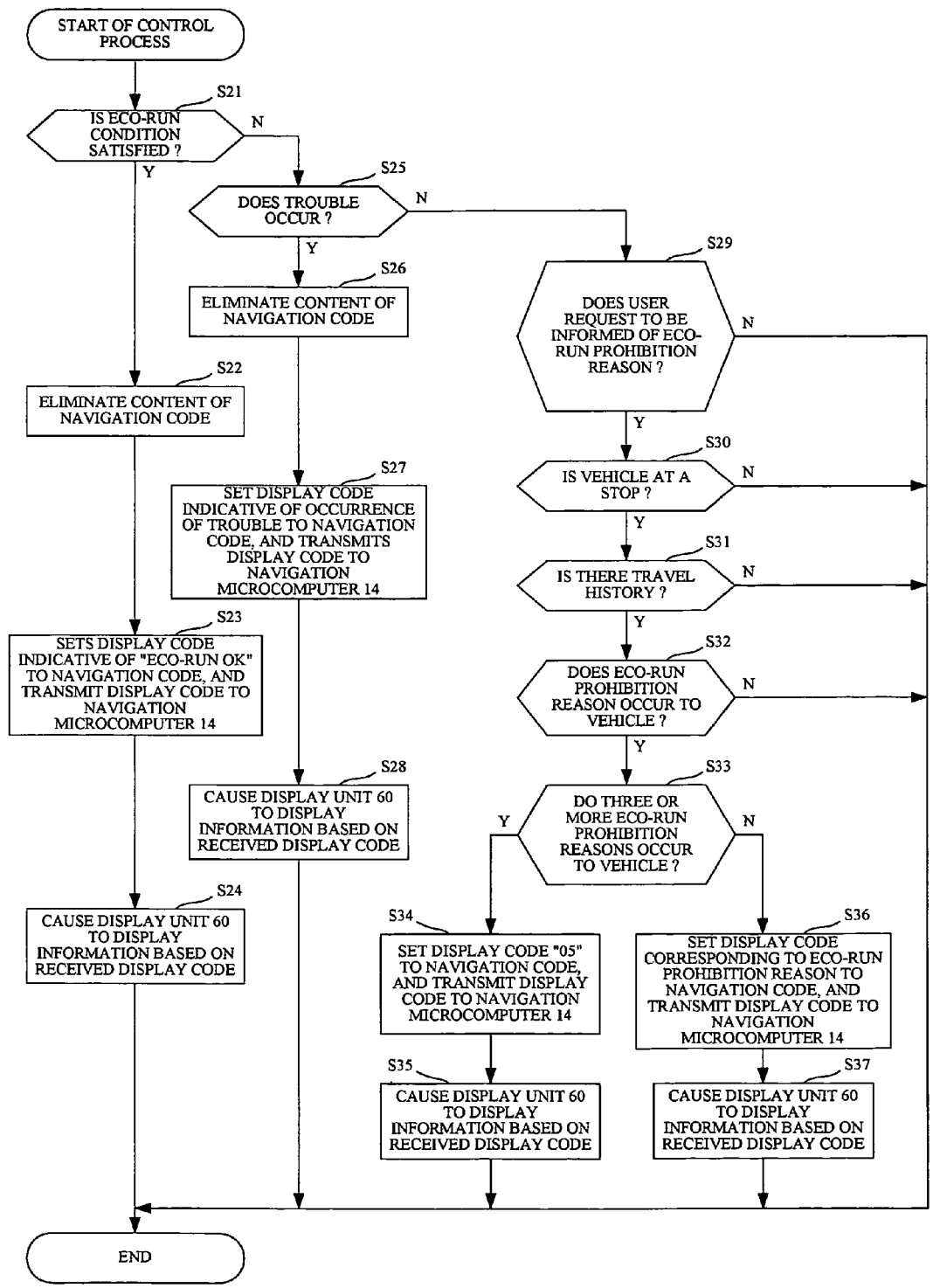
FIG. 8 is a flowchart showing a control process which the eco-run ECU executes.

FIG. 8 is a flowchart showing a control process which the eco-run ECU 10 executes.

The eco-run ECU 10 judges whether the eco-run condition is satisfied (step S21). Here, the eco-run ECU 10 judges whether the eco-run is executed (i.e., the engine is stopped) now. When at least one eco-run prohibition reason is satisfied, the eco-run ECU 10 judges that the eco-run condition is not satisfied.

When the eco-run condition is satisfied in step S21 (YES), the eco-run ECU 10 eliminates the content of a navigation code set to the RAM 103 or the nonvolatile memory 104 of the eco-run ECU 10 (step S22). The content of a navigation code set is eliminated because the display unit 60 displays incorrect information if the previous content of the navigation code is maintained.

Next, the eco-run ECU 10 sets a display code indicative of "eco-run OK" to the navigation code, and transmits the display code to the navigation microcomputer 14 (step S23). The navigation microcomputer 14 causes the display unit 60 to display information based on the received display code (step S24), and the present process is terminated. The information displayed on the display unit 60 in step S24 is information that composes a well-known navigation screen in which the eco-run is executed.

When the eco-run condition is not satisfied in step S21 (NO), the eco-run ECU 10 judges whether the trouble occurs to the sensors, the actuators, and so on connected to the eco-run ECU 10 (step S25).

When the trouble occurs to the sensors, the actuators, and so on connected to the eco-run ECU 10 in step S25 (YES), the eco-run ECU 10 eliminates the content of the navigation code set to the RAM 103 or the nonvolatile memory 104 of the eco-run ECU 10 (step S26), sets the display code indicative of occurrence of the trouble to the navigation code, and transmits the display code to the navigation microcomputer 14 (step S27). The navigation microcomputer 14 causes the display unit 60 to display information based on the received display code (step S28), and the present process is terminated. The information displayed on the display unit 60 in step S28 is information that composes the well-known navigation screen in which the user is informed of occurrence of the trouble.

When the trouble does not occur to the sensors, the actuators, and so on connected to the eco-run ECU 10 in step S25 (NO), the eco-run ECU 10 judges whether the user requests to be informed of the eco-run prohibition reason (step S29). Here, when the eco-run ECU 10 inputs the on-signal from the informing selection switch 28, the eco-run ECU 10 judges that the user requests to be informed of the eco-run prohibition reason.

It should be noted that, when the eco-run control is not executed by turning off the eco-run switch 20 or turning on the eco-run cancel switch 21, the user may not be informed of the eco-run prohibition reason. In this case, the item of "eco-run prohibition reason due to eco-run cancel SW" in FIG. 6 is eliminated.

When the user does not request to be informed of the eco-run prohibition reason in step S29 (NO), the present process is terminated.

On the other hand, when the user requests to be informed of the eco-run prohibition reason in step S29 (YES), the eco-run ECU 10 judges whether the vehicle is at a stop based on the sensor signal from the speed sensor 32 connected to the engine ECU 11 (step S30).

When the vehicle is not at a stop in step S30 (NO), the eco-run is not executed, and the present process is terminated. On the other hand, when the vehicle is at a stop (YES), the eco-run ECU judges whether there is the travel history stored into the RAM 103 or the nonvolatile memory 104 of the eco-run ECU 10 after the IG switch 23 is turned on (step S31).

When there is not the travel history in step S31 (NO), the eco-run is not executed, and the present process is terminated. On the other hand, when there is the travel history in step S31 (YES), the eco-run ECU 10 judges whether the eco-run prohibition reason occurs to the vehicle based on the table information in FIG. 6 stored into the RAM 103 or the nonvolatile memory 104 (step S32).

When the eco-run prohibition reason does not occur to the vehicle in step S32 (NO), the eco-run is not executed, and the present process is terminated. On the other hand, when the eco-run prohibition reason occurs to the vehicle in step S32 (YES), the eco-run ECU 10 judges whether three or more eco-run prohibition reasons occur to the vehicle (step S33). When three or more eco-run prohibition reasons occur to the vehicle (YES), the eco-run ECU 10 sets the display code "05" in the table information of FIG. 6 to the navigation code, and transmits the display code to the navigation microcomputer 14 (step S34). The navigation microcomputer 14 causes the display unit 60 to display information based on the received display code (step S35), and the present process is terminated.

Figure 9A:
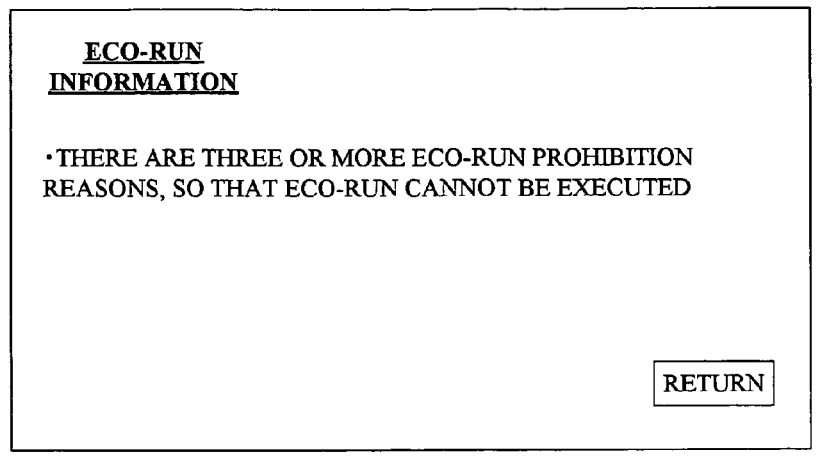
FIG. 9A is a diagram showing an example of information displayed on the display unit when three or more eco-run prohibition reasons are generated.

FIG. 9A is a diagram showing an example of information displayed on the display unit 60 in step S35. When three or more eco-run prohibition reasons occurs, the user cannot often cope with the eco-run prohibition reasons while driving, and hence the coping ways to the eco-run prohibition reasons are not displayed.

When three or more eco-run prohibition reasons does not occur to the vehicle in step S33 (NO), the eco-run ECU 10 sets the display code(s) corresponding to the eco-run prohibition reason(s) which has(have) occurred to the vehicle, to the navigation code, and transmits the display code(s) to the navigation microcomputer 14 (step S36). The navigation microcomputer 14 causes the display unit 60 to display information based on the received display code(s) (step S37), and the present process is terminated.

In the above-mentioned process, although the user is informed of the eco-run prohibition reason only while the vehicle is stopping, as shown in steps S30 and S34 to S37, the user may be informed of the eco-run prohibition reason while the ignition switch 23 is on, or the user may be informed of the eco-run prohibition reason such as "speed of vehicle is more than prescribed speed" while the vehicle is moving.

Figure 9B:
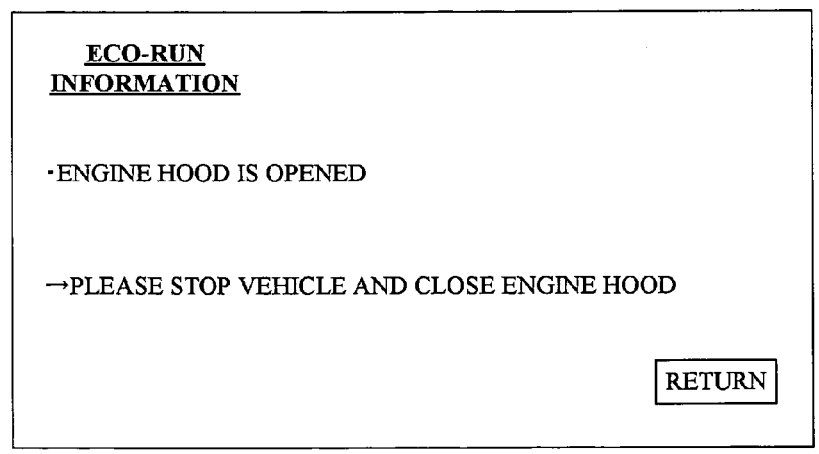
FIG. 9B is a diagram showing an example of information (an eco-run prohibition reason with which a user can cope) displayed on the display unit.
Figure 9C:
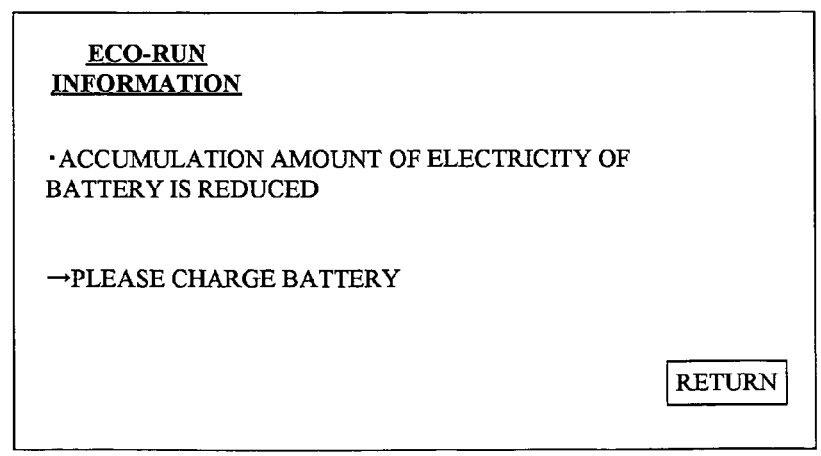
FIG. 9C is a diagram showing an example of information (an eco-run prohibition reason with which the user cannot cope) displayed on the display unit.

FIGS. 9B and 9C show examples of information displayed on the display unit 60 in step S37. Thus, the eco-run prohibition reason and the coping way are displayed one by one, so that there is an effect of becoming easy for the user to check them. When there are two eco-run prohibition reasons as shown in FIGS. 9B and 9C, the eco-run prohibition reason having a high priority with which the user can cope is displayed first. In the examples of FIGS. 9B and 9C, FIG. 9B indicates the eco-run prohibition reason with which the user can cope and FIG. 9C indicates the eco-run prohibition reason with which the user cannot cope, so that the information of FIG. 9B is first displayed, and then the information of FIG. 9C is displayed.

As described in detail above, according to the present embodiment, when it is judged by the eco-run ECU 10 that the eco-run prohibition reason occurs, the user is informed of the eco-run prohibition reason via the display of the display unit depending on the priority prescribed in the table information of FIG. 6. Thereby, the priority of the eco-run prohibition reason of which the user is informed can be prescribed by the table information, and hence it is possible to notify the user of the reason for prohibiting the eco-run effectively.

The table information of FIG. 6 prescribes highly the priorities of the eco-run prohibition reasons with which the user can cope, compared with the priorities of the eco-run prohibition reasons with which the user cannot cope. Therefore, the user is informed of the eco-run prohibition reasons with which the user can cope earlier than the eco-run prohibition reasons with which with which the user cannot cope, and hence it is possible to notify the user of the reasons for prohibiting the eco-run effectively. Especially, it can be reduced to give the stress to the user who wants to execute the eco-run as much as possible while driving.

In the above-mentioned embodiment, timing in which the user is informed of the eco-run prohibition reason is in the case where the vehicle is at a stop and there is the travel history, and hence it is possible to avoid holding user's attention while driving, and to avoid disturbing the driving of the vehicle.

When the eco-run switch 20 is off, or the eco-run cancel switch 21 is on, or the informing selection switch 28 is off, the informing of the eco-run prohibition reason is not executed by the navigation apparatus, so that the intention of the user who does not hope for the informing of the eco-run prohibition reason can be esteemed. The user can select whether the informing of the eco-run prohibition reason is executed, by the setting screen of informing forms of the eco-run prohibition reason in FIG. 7A, and hence it is possible to achieve an improved usability for the user.

In the above-mentioned table information of FIGS. 2 and 6, when a state of the vehicle correspond to three or more eco-run prohibition reasons, the vehicle corresponds to the item of "many codes". However, the number of eco-run prohibition reasons is not limited to this, but may be two or more.

Although in the above-mentioned first and second embodiments, the user is informed of the eco-run prohibition reason by the blinking of the lamp or the screen display, the present invention is applicable even when the user is informed of the eco-run prohibition reason by sound.

A recording medium on which the software program for realizing the functions of the above-mentioned first and second embodiments is recorded may be supplied to the eco-run system, and a computer (i.e., each of the ECUs 10 to 13, or the navigation microcomputer 14) of the eco-run system may read and execute the program recorded on the recording medium. In this manner, the same effects as those of the above-described first and second embodiments can be achieved. The recording medium for providing the program may be a CD-ROM, a DVD, or a SD card, for example.

Alternatively, the computer (i.e., each of the ECUs 10 to 13, or the navigation microcomputer 14) of the eco-run system may execute a software program for realizing the functions of the eco-run system, so as to achieve the same effects as those of the above-described first and second embodiments.

The above-described embodiments are examples of preferred embodiments of the present invention. However, the present invention is not limited to those embodiments, and various changes and modifications may be made to them, without departing from the scope of the invention.

The invention claimed is:

1. An eco-run system having an eco-run function that stops and restarts an internal combustion engine depending on a state of a vehicle, comprising:
    a prescribing portion that prescribes a relationship between a plurality of eco-run prohibition reasons and priorities in which a user is informed of the eco-run prohibition reasons;
    a priority setting portion that sets the priorities based upon frequency of occurrence of the eco-run prohibition reasons;
    a judgment portion that judges whether an eco-run prohibition reason occurs to the vehicle; and
    an informing portion that, when it is judged by the judgment portion that the eco-run prohibition reason occurs to the vehicle, informs the user of the eco-run prohibition reason depending on the priorities prescribed by the prescribing portion.

2. The eco-run system as claimed in claim 1 wherein the prescribing portion prescribes highly the priorities for the eco-run prohibition reasons with which the user can cope, compared with the priorities for the eco-run prohibition reasons with which the user cannot cope.

3. The eco-run system as claimed in claim 1, wherein when the eco-run prohibition reason is more than a given number, the informing portion informs the user of only a predetermined the eco-run prohibition reason.

4. The eco-run system as claimed in claim 1, wherein timing in which the user is informed of the eco-run prohibition reason is in the case where the vehicle is at a stop and there is a travel history.

5. The eco-run system as claimed in claim 1, wherein the eco-run prohibition reason includes no basic operation for executing eco-run.

6. The eco-run system as claimed in claim 1, further comprising a cancel portion that cancels the eco-run function,
    wherein the informing portion cancels the forming of the eco-run prohibition reason when the cancel portion is operated.

7. The eco-run system as claimed in claim 1, wherein the informing portion is composed of a lamp, informs the user of the eco-run prohibition reason by blinking when the vehicle is at a stop, and informs the user of occurrence of trouble of the vehicle by blinking when the vehicle is not at a stop.

8. The eco-run system as claimed in claim 1, wherein the informing portion is composed of a lamp, and changes a blinking way of the lamp for each of the eco-run prohibition reasons.

9. The eco-run system as claimed in claim 1, wherein the informing portion is composed of a lamp, and the eco-run prohibition reason having a high priority is configured such that the blinking of the lamp terminates early compared with the eco-run prohibition reason having a low priority.

10. The eco-run system as claimed in claim 1, wherein the informing portion is composed of a lamp, the eco-run system includes a setting portion that sets a code for blinking the lamp, and when a given condition is satisfied, the code set by the setting portion is eliminated and the lamp is turned off.

11. The eco-run system as claimed in claim 10 wherein the informing portion is composed of a lamp, the eco-run system includes a control portion that receives the code set by the setting portion and controls the blinking of the lamp, and when the vehicle is at a stop and there is a travel history, in the case where the control portion does not receive the code within a given period, the control portion controls the lamp to continuously light the lamp.

12. A computer readable medium causing a computer to execute a process, the computer being used by an eco-run system having an eco-run function that stops and restarts an internal combustion engine depending on a state of a vehicle, the process comprising:
   prescribing a relationship between a plurality of eco-run prohibition reasons and priorities in which a user is informed of the eco-run prohibition reasons, wherein the priorities are set based upon frequency of occurrence of the eco-run prohibition reasons;
   judging whether an eco-run prohibition reason occurs to the vehicle; and
   informing the user of the eco-run prohibition reason depending on the prescribed priorities when it is judged that the eco-run prohibition reason occurs to the vehicle.

13. An eco-run state informing apparatus that is provided in a vehicle capable of executing eco-run control, and informs a user of a reason for not stopping an internal combustion engine when stopping the internal combustion engine is not executed by the eco-run control, the eco-run control restarting the internal combustion engine after the internal combustion engine is stopped depending on a state of the vehicle, the eco-run state informing apparatus comprising:
   an informing control portion that, when stopping the internal combustion engine is not executed by the eco-run control, and an eco-run prohibition reason includes a reason of which the user should be informed, causes a prohibition reason informing portion to informs the user of the eco-run prohibition reason of which the user should be informed, the eco-run prohibition reason being a reason for not stopping the internal combustion engine; and
   a priority setting portion that sets priorities based upon frequency of occurrence of the eco-run prohibition reason,
   wherein when there are eco-run prohibition reasons of which the user should be informed, the informing control portion controls the prohibition reason informing portion to preferentially inform the user of the eco-run prohibition reason with which the user is able to cope, compared with the eco-run prohibition reason with which the user is not able to cope.

14. An eco-run state informing apparatus that is provided in a vehicle capable of executing eco-run control, and informs a user of a reason for not stopping an internal combustion engine when stopping the internal combustion engine is not executed by the eco-run control, the eco-run control restarting the internal combustion engine after the internal combustion engine is stopped depending on a state of the vehicle, the eco-run state informing apparatus comprising:
   an informing control portion that, when stopping the internal combustion engine is not executed by the eco-run control, and an eco-run prohibition reason includes a reason of which the user should be informed, causes a prohibition reason informing portion to informs the user of the eco-run prohibition reason of which the user should be informed, the eco-run prohibition reason being a reason for not stopping the internal combustion engine; and
   a priority setting portion that sets priorities based upon frequency of occurrence of the eco-run prohibition reason,
   wherein when there are eco-run prohibition reasons of which the user should be informed, the informing control portion controls the prohibition reason informing portion to preferentially inform the user of the eco-run prohibition reason with which the user is not able to cope, compared with the eco-run prohibition reason with which the user is able to cope.

15. An eco-run state informing apparatus that is provided in a vehicle capable of executing eco-run control, and informs a user of a reason for not stopping an internal combustion engine when stopping the internal combustion engine is not executed by the eco-run control, the eco-run control restarting the internal combustion engine after the internal combustion engine is stopped depending on a state of the vehicle, the eco-run state informing apparatus comprising:
   an informing control portion that, when stopping the internal combustion engine is not executed by the eco-run control, and an eco-run prohibition reason includes a reason of which the user should be informed, causes a prohibition reason informing portion to informs the user of the eco-run prohibition reason of which the user should be informed, the eco-run prohibition reason being a reason for not stopping the internal combustion engine; and
   a priority setting portion that sets priorities based upon frequency of occurrence of the eco-run prohibition reason,
   wherein when there are eco-run prohibition reasons of which the user should be informed, the informing control portion controls the prohibition reason informing portion to inform the user that there are many eco-run prohibition reasons.

* * * * *

UNITED STATES PATENT AND TRADEMARK OFFICE
CERTIFICATE OF CORRECTION

PATENT NO. : 8,417,435 B2
APPLICATION NO. : 12/450790
DATED : April 9, 2013
INVENTOR(S) : Kazuhi Yamaguchi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this
Twentieth Day of August, 2013

Teresa Stanek Rea
*Acting Director of the United States Patent and Trademark Office*